United States Patent [19]

Blais

[11] 4,344,722

[45] Aug. 17, 1982

[54] WATERPROOFING BARRIER

[75] Inventor: Jules M. Blais, Rosemere, Canada

[73] Assignee: Bemalux Inc., Montreal, Canada

[21] Appl. No.: 226,409

[22] Filed: Jan. 19, 1981

[30] Foreign Application Priority Data

Jan. 13, 1981 [CA] Canada .................................. 368420

[51] Int. Cl.³ ............................ E02D 3/12; E02D 3/14
[52] U.S. Cl. .................................. 405/270; 405/128
[58] Field of Search ........................... 52/169.7, 169.8; 405/52–55, 128, 129, 270

[56] References Cited

U.S. PATENT DOCUMENTS

| | | | |
|---|---|---|---|
| 2,847,201 | 8/1958 | Ebarb, Sr. ........................ | 405/53 X |
| 3,234,741 | 2/1966 | Ionides ............................. | 405/270 |
| 3,326,001 | 6/1967 | Stapelfield ...................... | 405/270 |
| 3,380,254 | 4/1968 | Rossi ............................... | 405/270 |
| 3,415,022 | 12/1968 | Schaefer et al. .............. | 405/270 X |
| 3,732,697 | 5/1973 | Dickson .......................... | 405/129 |
| 3,759,044 | 9/1973 | Caron et al. .................... | 405/267 |
| 4,166,709 | 9/1979 | Valiga ............................. | 405/55 X |
| 4,209,568 | 6/1980 | Clem ............................... | 405/270 X |
| 4,222,685 | 9/1980 | Jefferson et al. .............. | 405/270 |
| 4,255,067 | 3/1981 | Wright ............................ | 405/129 |

*Primary Examiner*—James A. Leppink
*Assistant Examiner*—George A. Suchfield
*Attorney, Agent, or Firm*—McFadden Fincham & Co.

[57] ABSTRACT

This invention provides a method and a system for waterproofing a desired substrate, and further contemplates, a waterproof and chemical-resistant product. The method provides providing a length of flexible moisture-permeable thin, synthetic sheet material having desired characteristics, placing in contact with the substrate to be waterproofed a layer of the material, covering the layer of material with a central layer of Montmorillonite clay and placing on top of the clay a third layer of the fabric.

36 Claims, 2 Drawing Figures

WATERPROOFING BARRIER

This invention relates to a method of constructing a waterproof and chemical-resistant surface, and to a product or system in the form of a waterproofed and chemical-resistant area.

More particularly, this invention relates to a waterproofing system which comprises a plurality of layers of material as will be outlined hereinafter. This invention also provides a liner system having such uses as retention of chemical waste, petroleum product storage, retention of animal waste as for example, on farms, and such other uses as will become apparent to those skilled in the art upon reading the following description.

In the past, waterproofing of substrate surfaces such as in the construction of ponds, lagoons, metal containers for retaining industrial waste to avoid toxic waste penetrating into the ground, etc., has been very limited in technology. For example, it has been proposed to use a non-permeable thermoplastic material and to form an impermeable barrier between the substrate surface—e.g., the ground—and the liquid to be retained. However, the use of such material causes various disadvantages. For instance, thermoplastic material such as polyethylene or nylon deteriorates over short periods of time when such materials come into contact with toxic wastes and thus, the life of a container using such a system is limited.

Another proposal which has been attempted, in this case for petroleum storage, is the use of processed sulphur, the sulphur being modified to improve strength characteristics, chemical resistance, etc. Such proposals involve applying molten sulphur to the desired area, and upon cooling, the sulphur hardens to a rigid liner. However, tests have proven that such a system, over certain periods of time and weather conditions, develop cracks and thus, are not suitable for the uses and applications contemplated by the present invention.

Pollution of the earth's natural resources and environment in recent years, has become of major concern, and as yet, a suitable storage area for industrial and chemical waste and contaminants has not been provided. Thus, it is often necessary to storage large quantities of highly contaminated wastes, and often, large steel tanks, concrete structures lined with a synthetic liner have been used. However, the aggressiveness of toxic chemicals in contact with these materials has had damaging effects on these structures. The use of earthen structures or lagoons for the containment of contaminated wastes is now becoming increasingly popular, but in order to prevent seepage and protect underground waters, an impervious liner must be applied.

The present invention overcomes the disadvantages with prior art methods of waterproofing and/or chemical containment by providing a method of constructing a water-proof surface adapted to be substantially impermeable to leaching of chemicals, comprising providing a length of flexible moisture-permeable, thin, synthetic sheet material having an elongation of between 20% to about 100%, a water permeation rate of between 5 and 200 ml./sq.cm./sec. as measured under a water pressure of 35 cm., and a tensile strength of at least 200 Newtons as measured in a substantially dry state; placing in substantial contact with said surface a first or bottom layer of the material; forming a second or center layer of expandable Montmorillonite clay actuatable by water on top of the first layer so as to substantially cover the first layer of flexible material with the clay; and placing a third or top layer of the flexible fabric in juxtaposition with said clay layer so as to substantially cover and confine the clay layer within the two layers of fabric; the fabric being characterized in that it is a flexible material capable of adhesion with the outer surfaces of the clay layer when the clay layer has been activated.

This invention also provides a product or system for waterproofing a desired area, and which waterproofed area may also be chemical-resistant. The product or system comprises a first or bottom layer of flexible moisture-permeable thin synthetic sheet material having an elongation of between 20% to about 100%, a water permeation rate of 5 to 200 ml./sq.cm./sec. as measured under a water pressure of 35 cm., and a tensile strength of at least 200 Newtons as measured in a substantially dry state; a second or center layer of expandable Montmorillonite clay actuatable in water lying on top of said first layer and substantially covering the first layer of flexible material; and a third or top layer of the flexible material in juxtaposition with the clay layer substantially covering the clay layer and confining the clay layer within the two layers of fabric, the fabric being characterized as being one capable of adhesion with the clay when the clay is activated.

In a preferred embodiment of this invention, the fabric utilized for the first and third layers may have an elongation of 50–100%, a water permeation rate of 20–100 ml./sq.cm./sec. as measured under a water pressure of 35 cm. and in particularly preferred embodiments, a water permeation rate of 20–60 ml./sq.cm./sec. as measured under the above conditions. The tensile strength of the fabric must be at least 200 Newtons, preferably at least 250 Newtons and more preferably at least 300 Newtons.

In accordance with this invention, applicant has found that by using the above method and system, a barrier or waterproofing system can be obtained which is non-permeable to industrial waste, thus preventing penetration into the ground of undesirable wastes. The waterproofing system will last many times the life obtained by utilizing known thermoplastic materials or by merely employing a layer of clay.

Having thus generally described the invention, reference will now be made to the accompanying drawings, in which.

Figure 1:
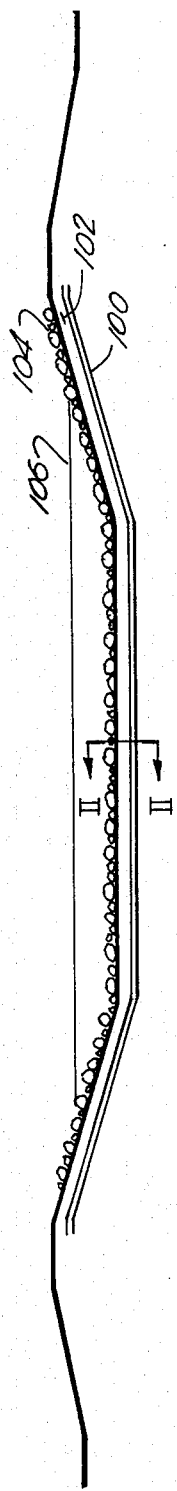
FIG. 1 is a cross-sectional view of the system of the present invention.

FIG. 1 shows the impermeable liner 100 of the present invention as utilized in a lagoon. As will be seen from FIG. 1, the liner may be covered by a layer of sand or earth 102 and a further layer of gravel or stones 104. 106 shows the product which is to be contained in the lagoon.

Figure 2:
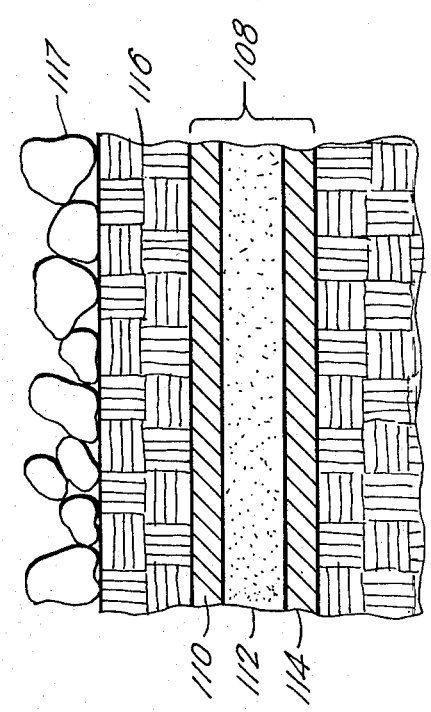
FIG. 2 is a section taken along the line II—II of FIG. 1.

Referring now to FIG. 2, the system of the present invention can be seen in greater detail. Thus, the waterproofing barrier of this invention is shown at 108 as comprising three layers 110, 112 and 114. Layers 110 and 114 are layers of a flexible moisture-permeable and chemical resistant thin sheet material. In carrying out the system of this invention, the synthetic sheet material layers 110 and 114 must be moisture permeable since the clay layer 112 contained between the two sheets of material is activated by water from both the top and bottom. Various materials possessing the desired characteristics may be employed and are known to those skilled in the art. Typical of such materials are nonwoven fabrics ranging in thickness from very thin or paper-like material to those which are ¼ inch or ½ inch thick, or more. In order to conform to the contours of a substrate to be waterproofed, the material should have an elongation of between about 20% to about 100%. As will be appreciated, the tensile strength of the fabric will depend on the pressure of the liquid to be contained within the waterproofed area, but it has been found that a tensile strength of at least 200 Newtons as measured in a substantially dry state is an acceptable level. In addition, the fabric layers 110 and 114 must be capable of adhesion with the clay layer 112, once activated, so that the clay will remain fixed and within the confines of the two fabric layers 110 and 114.

It will be appreciated that depending on the type of application, the sheet material utilized in the system of the present invention may vary. For instance, for use in retaining industrial waste which contains toxic substances, the sheet material would have to be chemical resistant. Thus, industrial waste may include sulfuric or other acids, and as such, the material utilized would have to be resistant to these. In this respect, a particularly preferred material for use in the present invention is that marketed under the trademark "The Bento-Mat System." The fiber of Bento-Mat Fabric is, in chemical terms, a saturated hydrocarbon. It is in view of its resistance to chemical attack that this fabric is particularly preferred in connection with the present invention for use in retaining chemical substances. In normal temperature conditions, several chemical products of different types has no effect on its physical properties The characteristic most notably pointed out with regard to this fabric is its excellent resistance to acid as well as to alkalis. Table I hereinbelow indicates the long term effects of acids, alkalis and various other solvents on Bento-Mat fabric. It has been found that some organic solvents such as xylene, toluene, perchloroethylene will dissolve the fabric at temperatures exceeding 100° C. and in freezing temperatures, the fabric takes on a gelatinous form, however, there is no known reagent which would act as a solvent on the Bento-Mat fabric at normal temperatures.

Table 1 below shows comparative results of the resistance of Bento-Mat fabric and other fabrics to acids and alkalis. Table 2 shows the effect of acids on Bento-Mat fabric; Table 3 shows the effect of alkalis on Bento-Mat fabric; and Table 4 shows the effect of other chemical products on The Bento-Mat System fabric.

TABLE 1

Comparative Table of the Resistance to Acids and Alkalis of Bento-Mat, Polyester and Nylon Fabrics

| Fabric | Reagent | Temp. °C. | Duration (weeks) | Residual Force % |
|---|---|---|---|---|
| Bento-Mat | 10% sodium hydrate | 100 | 6 | 80% |
| Polyester | 10% sodium hydrate | 100 | 6 | dissolved (2 hours) |
| Nylon | 10% sodium hydrate | 100 | 6 | disintegrated (4 weeks) |
| Bento-Mat | 96% sulfuric acid | 30 | 12 | 70% |
| Polyester | 96% sulfuric acid | 30 | 12 | dissolved immediately |
| Nylon | 96% sulfuric acid | 30 | 12 | dissolved immediately |
| Bento-Mat | 10% sulfuric acid | 70 | 12 | 100% |
| Polyester | 10% sulfuric acid | 70 | 12 | 65% |
| Nylon | 10% sulfuric acid | 70 | 12 | $\phi$ |

TABLE 2

Effect of Acids on Bento-Mat Fabric

| Acid | Concentration (% with water) | Temperature (°C.) | Temperature (°F.) | Residual Force % 12 wks. | Residual Force % 24 wks. |
|---|---|---|---|---|---|
| Hydrochloric | 35 | 30 | 85 | 90 | 90 |
| " | 7 | 70 | 158 | 100 | 100 |
| Nitric | 12 | 30 | 85 | 100 | 100 |
| Sulfuric | 10 | 30 | 85 | 100 | 100 |
| " | 10 | 70 | 158 | 100 | 100 |
| Formic | 10 | 30 | 85 | 100 | 100 |
| " | 90 | 70 | 158 | 95 | 95 |
| Oxalic | 10 | 70 | 158 | 100 | 100 |

TABLE 3

Effect of Alkalis on Bento-Mat Fabric

| Alkali | Concentration (% with water) | Temperature (°C.) | Temperature (°F.) | Duration (weeks) | Residual Force % |
|---|---|---|---|---|---|
| Sodium hydrate | 40 | 30 | 85 | 24 | 100 |
| Sodium hydrate | 40 | 70 | 158 | 24 | 95 |
| Sodium hydrate | 8 | 30 | 85 | 24 | 100 |
| Sodium hydrate | 8 | 70 | 158 | 24 | 95 |
| Aqueous ammonia | 35 | 30 | 85 | 24 | 100 |
| Aqueous ammonia | 35 | 70 | 158 | 24 | 100 |

TABLE 4

Effect of Different Chemical Products on Bento-Mat

| Agent | Concentration (% with water) | Temperature (°C.) | Temperature (°F.) | Duration (weeks) | Residual Force % |
|---|---|---|---|---|---|
| Formaldehyde | 40 | 30 | 85 | 24 | 100 |
| Gasoline | 100 | 30 | 85 | 24 | 100 |
| Mineral Oil | 100 | 30 | 85 | 24 | 100 |
| Diesel Oil | 100 | 30 | 85 | 24 | 100 |
| Diesel Oil | 100 | 70 | 158 | 24 | 90 |
| Ethylene Glycol | 100 | 70 | 158 | 24 | 100 |
| Cresol | 100 | 30 | 85 | 24 | 100 |
| Cresol | 100 | 70 | 158 | 24 | 95 |
| Chlorophenol | 100 | 30 | 85 | 24 | 100 |
| Chlorophenol | 100 | 70 | 158 | 24 | 95 |

One of the disadvantages encountered with previous liner systems has been the growth of weeds sprouting up through the liners, and thereby causing cracks in the systems. Utilizing the Bento-Matfabric according to this invention has overcome this disadvantage in that any vegetation growth would not be supported by the fibers. Some micro-organisms are capable of sprouting on quantities of contaminants which are present on the surface of the fabric, but this growth has no effect on the strength of the fabric.

The liner system of the present invention utilizing Bento-Matfabric is invulnerable to climate conditions such as humidity, frost and deviation in temperature. as well as being insensitive to all active substances present in soil.

Table 5 below indicates characteristics of two types of Bento-Mat fabric.

TABLE 5

| Characteristics | Bento-Mat B-300 | Bento-Mat B-400 | Test |
|---|---|---|---|
| Density (gr.) | .97 g/cm$^3$ | .97 g/cm$^3$ | |
| Weight (gr.) | 300 g/m$^2$ | 400 g/m$^2$ | CAN2-5.A |
| Tensile Strength (N) | 650 N | 875 N | CAN2-9.2 |
| Tear Resistance (N) | 270 N | 290 N | CAN2-12.2 |
| Burst Strength | 1125 N | 1550 N | CAN2-11.2 |
| Elongation (%) | 70–100 | 70–100 | |
| Permeability (ml/cm$^2$/sec) | 20 | 20 | |

Referring once again to the drawings, the clay layer utilized in the liner system is designated by reference numeral 112. Layer 112 is a layer of clay known as Montmorillonite. Montmorillonite clay is one in which generally about 1/6 of the aluminum atoms are replaced by magnesium atoms, and varying amounts of hydrogen, sodium, potassium, calcium and and magnesium are loosely combined. Montmorillonite clay is commonly found in bentonite clay. Bentonite is now defined as a clay containing not less than 85% of Montmorillonite. In a preferred embodiment of this invention, the clay employed is bentonite, and more particularly, sodium or calcium bentonite. The clay employed is characterized by being activatable by water so as to expand or swell at least to 2 or more times its size when dry. Preferably, the clay should expand to 10 times or more its dry size and in this respect, sodium bentonite clay is preferred.

The clay layer 112 may be applied to the surface to be waterproofed in an amount of from ½ pound to 10 pounds or more depending on the type of application, whether it is for a pond or for a retention pool for industrial waste. For instance, in the case of a small pond, ½ pound per square foot would be substantial. In the case of a pond with a 20 foot depth, 5–20 pounds may be employed.

Once the clay layer has been activated, by water, it forms an adhesive layer with the two fabric layers 110 and 114. The clay, when activated, forms a kind of gel and has a consistency much like that of grease. The clay thus forms a membrane or barrier together with the layers of fabric.

Activation of the clay may be effected by rain, or by any other method using water. The clay is also activated through the bottom fabric layer by moisture from the ground on which the layer has been placed. In the case when the waterproofing system of this invention is to be utilized for retention of contaminants, it may be desirable, in order to achieve full activation of the bentonite, that the layers be in contact with water for 7 days, before utilizing the liner to retain contaminants.

The bentonite clay particles may range in size from 10 to 200 mesh, and in preferred embodiments, from 20 to 150 mesh.

In carrying out the method of the present invention, it may be desirable to clear and/or level the ground or substrate to be waterproofed before applying the layers of material, so as to form a substantially level or even site, even although the sides may be sloped. If desired, the surface to be treated may be compacted using suitable rollers or the like. The sheet material which may come in rolls of varying width may then be applied to the substrate so as to substantially cover the substrate. If necessary, the edges of the widths of material may be overlapped and/or joined together. The montmorillonite clay is then applied over the layer of sheet material, preferably in a substantially continuous layer. Spreading of the clay layer may be carried out using suitable machinery or can easily be applied with a rake. Depending on the end use of the waterproofed area, the clay layer is applied in the desired weight per square foot.

Once the clay layer has been spread, the third layer, of the same sheet material as the first layer, is then laid on top of the clay, again overlapping if required. The edges of the layers may be covered by soil or sand, etc., so as to close off the edges.

If desired, a further layer may optionally be placed on top of the three layers to act as a protective covering. As will be seen from FIG. 2, layers 116 and 117 are optional additional layers which provide protection for the liner system of the present invention. Such layers 116, 117 may comprise from 2 inches to 2 feet in thickness of gravel, stones, sand, or any other suitable material. This further layer or layers render the waterproof layer less susceptible to damage, for instance, in the case when this invention is utilized in an animal pen for retaining manure, the waterproof layer would be protected from damage by animals by this additional layer or layers.

Normally, activation of the clay is brought about by rain, however, if faster hydration if required, water can be applied in any other manner. As mentioned previously, before introducing contaminated substances into the liner, it is preferable that the clay be hydrated for 7 days or more to ensure complete activation of the layer.

The waterproofing system of the present invention has many advantages over known systems. Thus, the lifespan of the instant system is much longer than that of known systems, such as plastic sheets. The system is relatively economical and easy to carry out, either manually or with suitable equipment, and in addition, the materials utilized are readily available. In addition, the present invention overcomes long-standing problems such as for the retention of oil refinery by-products, wastes from chemical treatment plants, etc.

It will be appreciated that changes and modifications may be made to the above-described embodiments without departing from the spirit and scope of the invention.

I claim:

1. A method of constructing a waterproof surface adapted to be substantially impermeable to leaching of chemicals comprising providing a length of flexible moisture-permeable, thin, synthetic sheet material having an elongation of between 20% to about 100%, a water permeation rate of between 5 and 200 ml./sq.cm./sec. as measured under a water pressure of 35 cm., and a tensile strength of at least 200 Newtons as measured is a substantially dry state;

placing in substantial contact with said surface a first or bottom layer of the material;

forming a second or center layer of expandable Montmorillonite clay by water on top of said first layer so as to substantially cover said first layer or flexible material with the clay;

and placing a third or top layer of the flexible fabric in juxtaposition with said clay layer so as to substantially cover and confine the clay layer within the two layers of fabric;

the fabric being characterized in that it is a flexible material capable of adhesion with the outer surfaces of the clay layer when the clay layer has been activated.

2. The method of claim 1 wherein said clay is sodium bentonite.

3. The method of claim 1 wherein said clay is calcium bentonite.

4. The method of claim 1 including the further step of levelling and compacting the area to be waterproofed, prior to placing of the first or bottom layer of fabric thereon, so as to provide a substantially even surface.

5. The method of claim 1 including the further step of placing a fourth layer of protective material over said third layer of flexible fabric.

6. The method of claim 5 wherein said fourth layer comprises sand, stones or gravel.

7. The method of claim 1 or 5 including the further step of activating said clay through the application of water to said clay.

8. The method of claim 7 wherein said clay is activated by being in contact with water for 7 days.

9. The method of claim 1 wherein the average particle size of said clay ranges from 10 to 200 mesh.

10. The method of claim 1 wherein the average particle size of said clay ranges from 20 to 150 mesh.

11. The method of claim 1 wherein said the elongation of said flexible material ranges between 50-100%.

12. The method of claim 1 wherein the flexible material has a water permeation rate of 20-100 ml./sq.cm./sec. as measured under a water pressure of 35 cm.

13. The method of claim 1 wherein the flexible material has a water permeation rate of 20-60 ml./sq.cm./sec. as measured under a water pressure of 35 cm.

14. The method of claim 1 wherein the flexible material has a tensile strength of at least 250 Newtons.

15. The method of claim 1 wherein the flexible material has a tensile strength of at least 300 Newtons.

16. The method of claim 1 wherein said flexible material is a non-woven fabric ranging in thickness from ¼ inch to ½ inch or more.

17. The method of claim 1 wherein said layer is applied in an amount of from ½ pound to 20 pounds or more.

18. The method of claim 1 wherein the edges of said layers are sealed by covering with soil or sand.

19. The method of claim 1 wherein said flexible material utilized is that marketed under the trademark "The Bento-Mat System".

20. A system for waterproofing a desired area, said system comprising a first or bottom layer of flexible moisture-permeable thin synthetic sheet material having an elongation of between 20% to about 100%, a water permeation rate of 5 to 500 ml./sq.cm./sec. as measured under a water pressure of 35 cm., and a tensile strength of at least 200 Newtons as measured in a substantially dry state; a second or center layer of expandable montmorillonite clay actuatable in water lying on top of said first layer and substantially covering the first layer of flexible material; and a third or top layer of the flexible material in juxtaposition with the clay layer substantially covering the clay layer and confining the clay layer within the two layers of fabric, the fabric being characterized as being one capable of adhesion with the clay when the clay is activated.

21. A system as claimed in claim 20 wherein said clay is sodium bentonite.

22. A system aS claimed in claim 20 wherein said clay is calcium bentonite.

23. A system as claimed in claim 20 wherein there is provided a fourth layer of protective material over said third layer of flexible.

24. A system as claimed in claim 23 wherein said fourth layer is comprised of sand, stones or gravel.

25. A system as claimed in claim 20 wherein the average particle size of said clay ranges from 10 to 200 mesh.

26. A system as claimed in claim 20 wherein the average particle size of said clay ranges from 20 to 150 mesh.

27. A system as claimed in claim 20 wherein the elongation of said flexible material ranges between 50-100%.

28. A system as claimed in claim 20 wherein said flexible material has a water permeation rate of 20-100 ml./sq.cm./sec. as measured under a water pressure of 35 cm.

29. A system as claimed in claim 20 wherein said flexible material has a water permeation of 20-60 ml./sq.cm./sec. as measured under a water pressure of 35 cm.

30. A system as claimed in claim 20 wherein said flexible material has a tensile strength of at least 250 Newtons.

31. A system as claimed in claim 20 wherein said flexible material has a tensile strength of at least 300 Newtons.

32. A system as claimed in claim 20 wherein said flexible material is a non-woven fabric ranging in thickness from ¼ inch to ½ inch or more.

33. A system as claimed in claim 20 wherein said clay layer is applied in an amount of from ½ pound to 20 pounds or more.

34. A system as claimed in claim 20 wherein said clay is activated by being in contact with water for 7 days.

35. A system as claimed in claim 20 wherein the edges of said layers are sealed by a layer of soil or sand.

36. A system as claimed in claim 20 wherein said flexible material is that marketed under the trademark "The Bento-Mat System".

* * * * *